United States Patent [19]

Lewis

[11] Patent Number: 4,853,821

[45] Date of Patent: Aug. 1, 1989

[54] ALTERNATING CURRENT POWER SENSING DEVICE FOR PREVENTING START-UP AT POWER RESTORATION

[76] Inventor: Dennis E. Lewis, 22 Birkshire Cir., Ware, Mass. 01082

[21] Appl. No.: 277,238

[22] Filed: Nov. 29, 1988

[51] Int. Cl.$^4$ ............................................. H02H 3/24
[52] U.S. Cl. .................................. 361/92; 361/58; 307/130; 307/326; 340/663
[58] Field of Search ................ 361/49, 58, 59, 71, 361/72, 92, 114, 23; 307/326, 328, 126, 130, 131, 142; 335/20, 21, 24, 19; 340/652, 663; 200/51.09

[56] References Cited
U.S. PATENT DOCUMENTS 2,985,800  5/1961  Cook ..................................... 361/23
3,958,164  5/1976  Hess ...................................... 361/92
4,466,040  8/1984  Barthel et al. ................... 307/130 X

*Primary Examiner*—Todd E. Deboer
*Attorney, Agent, or Firm*—McCormick, Paulding & Huber

[57] ABSTRACT

Safety appparatus for sensing an electrically powered device connected to an AC power source to prevent the start-up of the device upon power restoration when the power device is in its "ON" operative condition includes a current sensing circuit that is responsive to reconnection of such a load to prevent the establishment of an electrical circuit path through the device. Included are circuits for sensing the presence of the AC power and for the generation of the sensing current are also presented.

9 Claims, 2 Drawing Sheets

ALTERNATING CURRENT POWER SENSING DEVICE FOR PREVENTING START-UP AT POWER RESTORATION

BACKGROUND OF THE INVENTION

The present invention relates generally to safety devices for use with electrically operated power devices, such as, tools and machinery, and deals more specifically with apparatus for preventing the start-up of a power device after AC power is restored when the power device is in an "ON" condition.

A very serious and dangerous condition leading to bodily injury can arise from tools and machinery that are controlled by a toggle switch "ON-OFF" that may be operated and left in the "ON" position when AC power to the machine or tool fails. The operator of the machine or tool may not have time or the presence of mind to operate the toggle switch to the "OFF" position before the AC power is restored. Such a sequence may result in the machine or tool restarting at an unexpected time thereby causing injury to the operator or other personnel in the area of the machine. The Occupational Safety and Health Administration "OSHA" has recognized this safety problem and now requires that electrically powered devices with a toggle switch to change the state between an "ON" and "OFF" condition be equipped with a safety device that will prevent the electrically powered device from restarting automatically when the AC power is restored.

Currently known devices generally consist of a relay that has its coil powered by the line voltage through a normally open push button switch and latching circuit. After power is restored, the operator may activate the push switch to provide power to the machine or tool. However, if the toggle switch of the machine or tool is left in the "ON" position, the machine will restart immediately.

Therefore, it is a general object of the present invention to provide a safety device to prevent power from being restored to the machine or tool after AC power is restored when the machine or tool is left in the "ON" condition.

It is a further object of the present invention to provide a safety device that connects and disconnects the power device from an AC power line without switching large line currents thereby reducing the complexity and cost of the safety device.

SUMMARY OF THE INVENTION

In accordance with the present invention, safety apparatus for sensing an electrically powered device coupled to an AC power source to prevent the start-up of the device after power interruption upon an attempt to restore power to the device when the device is in its "ON" operative condition is presented. The safety device has a power receptacle for receiving the electrical power cord of the device to be powered and has its own power cord for connection to a standard AC power outlet. In the normal operation, an electrical circuit path exists between the AC power outlet and the power cord of the power device. When power is removed from the power device, such as for example, when the power cord is accidentally unplugged from the AC power outlet, the circuit path to the device becomes an open circuit and sensing a current generated in the safety device flows in a path which has the "ON/OFF" power switch of the device in series with the sensing current path. If the switch of the power device is in its "ON" condition, the circuit path for the sensing current is completed and the sensing current is detected. In response to the detection of the sensing current, a relay contact in series with the start switch of the safety apparatus and which switch is operated to activate on AC relay to cause completion of the electrical circuit path through the safety device, is operated to an open condition to prohibit the operation of the AC relay which has transfer contacts in series with the electrical path. Upon operating the switch of the power device to its "OFF" condition, the sensing current is interrupted and the safety device may be reset upon restoration of the AC power to permit the AC relay to be operated when the start switch of the safety device is operated thereby completing the electrical circuit path through the safety device. Since the device to be powered is in its "OFF" condition, no line currents are switched by the operation of the AC relay thereby eliminating arcing at the relay contacts and further eliminating the need for complex arc suppression devices.

BRIEF DESCRIPTION OF THE DRAWINGS

Additional features and advantages of the present invention will become readily apparent from the following description and figures wherein.

DETAILED DESCRIPTION OF THE PREFERRED EMBODIMENTS

Figure 1:
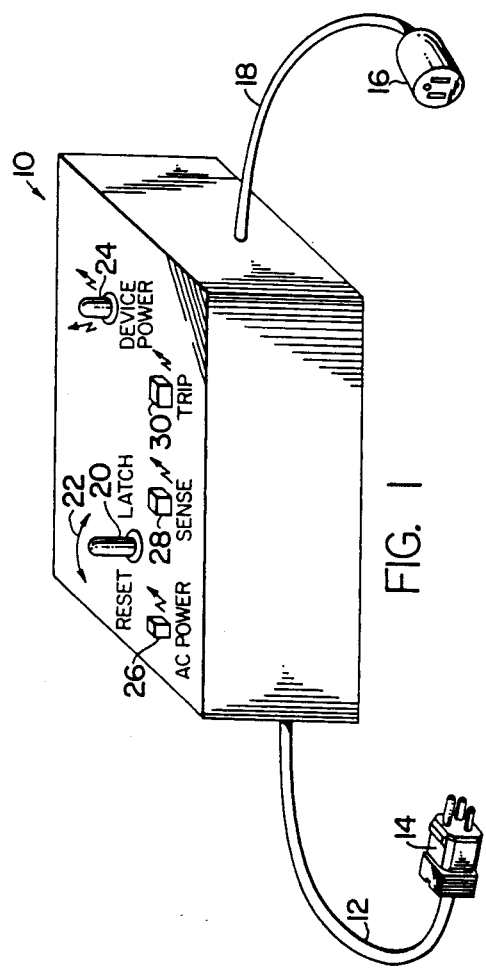
FIG. 1 is a somewhat schematic, perspective of view of the safety apparatus embodying the present invention.

Turning now to the drawings and considering FIG. 1 in particular, safety apparatus for sensing an electrically powered device embodying the present invention is shown therein and designated generally 10. The apparatus includes an AC power cord 12 and plug 14 for connection to a standard AC power outlet. A device to be powered is connected to an AC power receptacle 16 which is connected by a power cord 18 to the safety of apparatus 10. In normal operation, that is, when the plug 14 is connected to an electrical outlet, an electrically powered device is connected to the AC power receptacle 16 and with the device in its "OFF" condition, a momentarily operated switch 20 is operated in a direction indicated by arrow 22 to its "LATCH" position which causes a relay within the safety apparatus and as described in further detail below, to operate and provide an electrical circuit path between the AC plug 14 and the AC power receptacle 16. An indicator 24 illuminates when AC power is available at the receptacle 16. The indicator 24 may be a neon lamp or other suitable indicating device. The indicator 24 will not be illuminated when the electrical circuit path is an open circuit. An indicator 26 may be a light emitting diode (LED) which will be illuminated when the plug 14 is connected to an AC power source. Another indicator 28 which may be a LED is illuminated to indicate that sensing current is being generated by the safety apparatus 10. An additional indicator 30 in the form of a LED illuminates to indicate that the safety apparatus 10 has sensed an attempt to restore AC power to the power device when the device was left in its "ON" position. In order to restore power to the power device, the power device must be operated to its "OFF" condition and the momentarily operated switch 20 operated to the "RESET" position to enable the safety apparatus and then operated to its "LATCH" position to cause the electrical circuit path through the safety apparatus to be closed at which time the AC power indicator 24 is illuminated alerting the operator that the power device may now be returned to its "ON" condition. The trip indicator 30 is extinguished and the indicators 26 and 28 are illuminated indicating that AC power and sensing current, respectively, are present.

Figure 2:
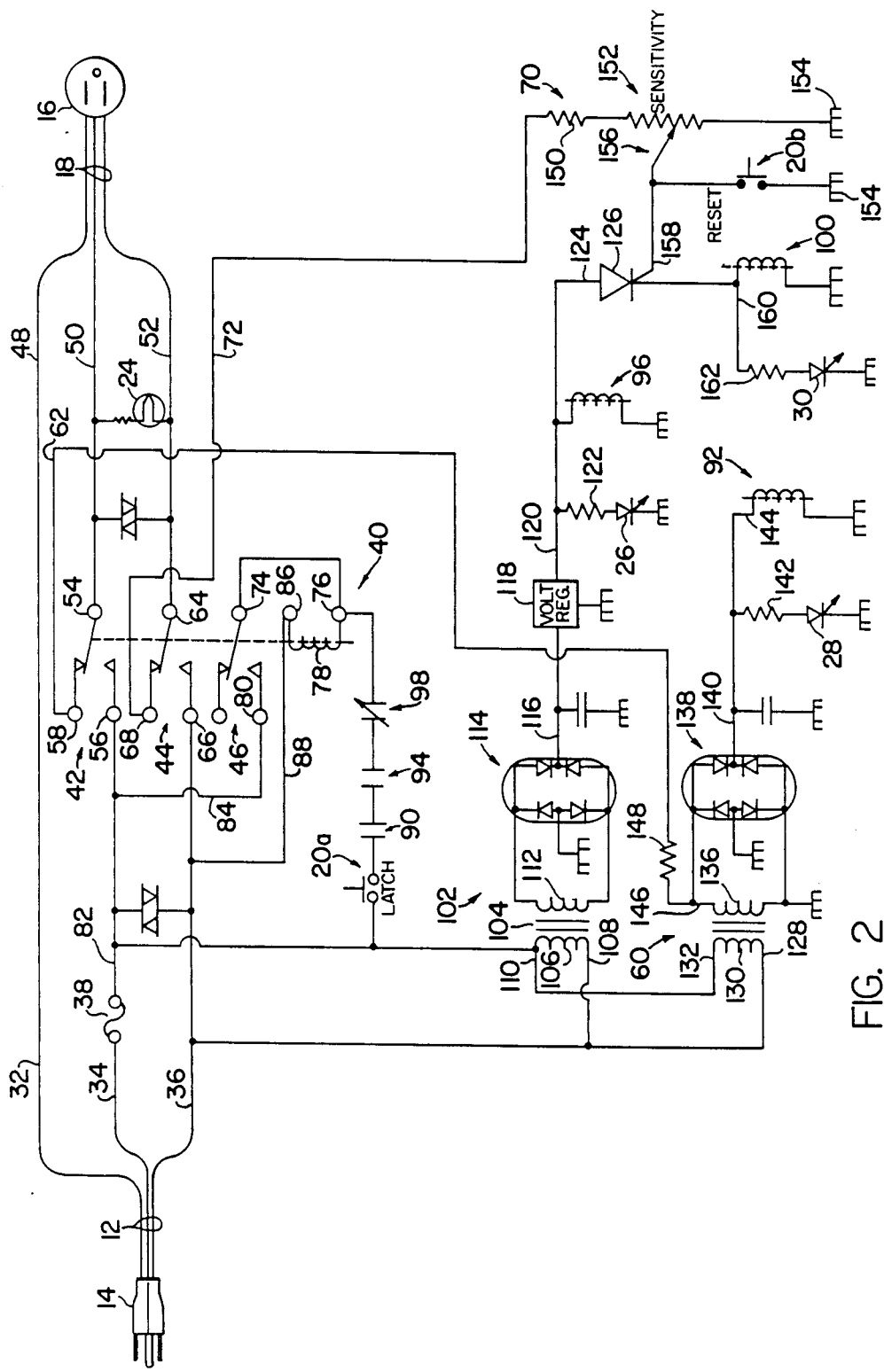
FIG. 2 is an electrical schematic diagram illustrating one embodiment of the present invention.

Turning now to FIG. 2, an electrical schematic diagram embodying the safety apparatus of the present invention is shown therein wherein the AC power cord 12 is shown comprising a "ground" lead 32, a "hot" lead 34 and a "neutral" lead 36. An AC voltage potential equal to a nominal 120 volts is developed across the leads 34 and 36 when the plug 14 is connected to an AC power outlet. A fuse 38 is in series with the "hot" lead of the AC line and it functions in a well known manner. The AC electrical circuit path is completed through the apparatus when an AC relay designated generally 40 is operated to cause its associated transfer contacts designated 42, 44 and 46, respectively, to make power present at the AC power receptacle 16 via the power cord 18.

The power cord 18 is made up of a "grounding side" 48 which is directly connected to the "grounding side" 32 of the power cord 12. The "hot" lead or "hot" side of the line is designated 50 and the "neutral" side is designated 52. With the "hot" side 50 being connected through the transfer contact 42 to the "hot" side 34 of the power cord 12 and the "neutral" side 52 being connected through the transfer contact 44 to the "neutral" side 36 of the power cord 12. In the illustrated embodiment, transfer relay contact 42 comprises a swing terminal 54 connected to the "hot" lead 50, a normally open contact terminal 56 connected to the "hot" side 34 of the power cord 12 through the fuse 38 and a normally closed terminal 58 connected to the sensing current generating circuit designated generally 60 via the lead 62. The relay transfer contact 44 includes a swing or terminal 64 connected to the "neutral" side 52 of the power cord 18, a normally open terminal 66 connected to the "neutral" side 36 of the power cord 12 and a normally closed terminal 68 connected to a sensing circuit generally designated 70 via the lead 72.

The transfer contact 46 operates as a latching contact to keep the relay 40 operated once it has been operated and comprises a common terminal connected to one end 76 of the AC coil 78 of the AC relay 40. The transfer contact 46 further includes a normally open terminal 80 connected to the fused side 82 of the "hot" side of the AC line via the lead 84. The opposite end 86 of the relay coil 78 is connected to the "neutral" side of the AC line at lead 36 via lead 88. When the relay 40 is operated, the transfer contact 46 is operated to cause the one end of 76 of the coil to be connected to the "hot" side of the AC line through the now closed contact making continuity between the terminal 74 and 80. Since the opposite end 86 of the coil 78 is connected to the "neutral" side of the AC line, power is applied through the latched relay contact 46 to maintain the operation of the AC relay 40.

In order to operate the relay 40, it is seen that the coil 78 requires power to be applied to one end 76 since its opposite end 86 is connected to the "neutral" side of the line. As illustrated in FIG. 2, a series arrangement of relay contacts and the latch switch 20a provide an electrical path to the fused side 82 of the AC electrical line. The latch switch 20a and the reset switch 20b form the momentarily operated switch 20 as described above. The normally open relay contact 90 is associated with relay 92 and the normally open relay contact 94 is associated with relay 96. A normally closed relay contact 98 is associated with relay 100. The operation and function of relays 92, 96 and 100 are explained below, however, it is seen that in order to complete the circuit path to operate the relay 40, it is necessary that the normally open relay contacts 90 and 94 be closed and that the normally closed contact 98 remain closed to permit the latch switch 20a to complete the circuit to the "hot" side of the line and operate the relay. As explained above, once the relay 40 is operated, its latching transfer contact 46 operates thereby completing a latching path to the fused side of the AC line. The latch switch 20a, being a momentarily operated switch, returns to its open state upon release by the operator.

The safety apparatus of the present invention further includes a circuit designated generally 102 for verifying the presence of AC power at the input to the safety apparatus via the plug 14. The circuit 102 comprises a transformer 104 having its primary winding 106 electrically connected across the AC line with one end 108 connected to the "neutral" side and its opposite end 110 connected to the fused side of the AC line.

The transformer 104 has a secondary winding 112 electrically connected to a full wave bridge circuit designated generally 114. The transformer 104 is a step down transformer providing nominal 12 volts across the secondary winding 112 which is rectified by the full wave bridge 114 to provide a full wave rectified voltage at lead 116. The full wave rectified voltage is inputted to a semiconductor voltage regulator 118 which in turn provides a 12 volt regulated DC voltage at its output 120. The operation of the voltage regulator 118 is well known to those skilled in the art and further explanation is not necessary in this disclosure for an understanding of the operation of the present invention. The presence of the 12 volt DC signal on lead 120 provides power to cause the LED 26 to emit light indicating the presence of AC power. The LED 26 is connected to the DC voltage on line 20 through a series resistor 122. The presence of the DC voltage on lead 120 also operates the relay 96 and which relay operation only occurs when an AC voltage is present. The operation of the relay 96 causes its associated normally open relay contact 94 to close.

The 12 volt DC signal on lead 120 is also connected to the anode side 124 of a silicone controlled rectifier (SCR) 126 and which SCR is used to provide a circuit path to operate the relay 100 in response to the sensing of a load as explained further below.

The sensing current generating circuit 60 includes a transformer 128 which includes a primary winding 130 having respective ends 132 and 134 connected across the AC line at the leads 36 and 82, respectively. The transformer 128 also includes a secondary winding 136 across which a 12 volt AC signal is impressed when AC voltage is present at the plug 14. A full wave bridge designated generally 138 is connected across the secondary winding 136 and provides a full wave rectified DC voltage at its output lead 140. The LED 28 illuminates when the full wave rectified voltage is present on the lead 140 to indicate that sensing current is present. The LED 28 is connected to the voltage present on lead 140 through the resistor 142.

The lead 140 is also connected to one end 144 of the relay coil 92 to cause that relay to operate when the 12 voltage potential is present on the lead 140. The operation of the relay 92 causes its associated normally open contact 90 to close and form a part of the electrical circuit path necessary to operate the AC relay 40 as explained above.

When AC power is temporarily interrupted, such as, for example, removing the plug 14 from the AC power outlet, the relay 40 returns to its normally unoperated state. When AC power is restored, such as, for example, by reinserting the plug 14 into the AC power outlet, it is necessary to operate the "LATCH" switch 20a to cause the relay 40 to operate as explained above. However, if the power device connected to the outlet receptacle 16 is in its "ON" condition, sensing current flows from one side 146 of the secondary winding 136 through a resistor 148, through the lead 62, through the normally closed transfer contact 42, through the lead 50 and through the power device since it is in the "ON" condition back into the lead 52, through the normally closed relay contact 44 and lead 72 which is connected to a resistor 150 of the current sensing circuit 70. The resistor 150 is connected to one side of a variable resistance or potentiometer 152 to a ground reference potential 154. The potentiometer 152 is used to adjust the sensitivity of the safety apparatus and includes a wiper 156 which is adjusted to control the magnitude of the sensing current. It has been found that a sensitivity of approximately 10-12 milliamperes is suitable for most tools and machines including those tools having semi conductor variable speed control power switches.

The wiper 156 of the sensitivity potentiometer 152 is connected to the gate terminal 158 of the SCR 126 which causes the SCR to become conductive to complete a circuit path between the one end 160 of the relay 100 to the voltage potential present on the lead 120. When the SCR 126 becomes conductive, the LED 130 is also connected to the voltage on the lead 120 through the resistor 162 which causes the LED to emit light alerting the operator that a trip condition exists, that is, that an attempt has been made to restore AC power to the power device when the device was in the "ON" condition. Operation of the relay 100 causes it normally closed relay contact 98 to open and thereby open the electrical path to the AC relay 40 which prevents operation of the relay 40 when the "LATCH" switch 20a is operated.

In order to complete the electrical path to the AC relay 40 it is necessary to reset the SCR 126, that is, cause it to become nonconductive and this is done by operating the "RESET" switch 20b which momentarily connects the gate terminal 158 to the ground reference potential 154 causing the relay 100 to again become non-operative and returning the normally closed contact 98 to its normally closed condition. If the power switch of the power device is still in the "ON" condition, the SCR 126 will again become conductive within a half cycle to again prevent the operation of relay 40. When the power switch of the power device is returned to the "OFF" condition, the electrical path for the sensing current is interrupted thereby permitting the operation of the "RESET" switch 20b to cause the SCR 126 to become non-conductive and thereby enabling the electrical circuit path to cause the relay 40 to operate and restore power to the power device. Since the relay 40 operates prior to the operation of the power device, no electrical current is switched through the relay transfer contacts 42 and 44, respectively. Thus, any need for arc protection or other voltage suppression devices is eliminated with the present invention.

Safety apparatus for sensing an electrically powered device coupled to an AC power source to prevent the start-up of the device after power interruption upon an attempt to restore power to the device when the device is in its "ON" operative condition has been presented above in an preferred embodiment. It will be recognized by those skilled in the art that the choice of components may vary and that other implementations of the apparatus are available. Therefore, the present invention has been presented by way of illustration rather than limitation.

I claim:

1. Safety start-up apparatus for sensing an electrically powered device coupled to an AC power source to prevent the start-up of the device after power interruption upon an attempt to restore power to the device when the device is in its "ON" operative condition, said apparatus comprising:

means for electrically coupling said apparatus to an AC power source;

means for receiving a power cord associated with a device to be electrically powered, said receiving means being electrically coupled to said apparatus;

means for producing a sensing current;

means for sensing an electrically powered device connected to said receiving means by detecting the presence of said sensing current passing through the electrically powered device;

means for providing an electrical circuit path between said AC power coupling means and said power cord receiving means, said circuit path providing means having a first and second operative state wherein said first state provides a first electrical circuit path between said AC power coupling means and said power cord receiving means to operate said device and said second state provides a second electrical circuit path between said power cord receiving means and said means for sensing a device;

means for verifying the presence of said sensing current to be used by said sensing means;

means responsive to the removal of AC power to said apparatus for causing said circuit path providing means to become an open-circuit thereby introducing a first discontinuity in the circuit path between the AC power source and the power device, and means responsive to said means for sensing a device for detecting the connection of the power device when said power device is in an "ON" condition to prevent the start-up of the power device when AC power is restored to said apparatus by introducing a second discontinuity.

2. Safety start-up apparatus as defined in claim 1, wherein said circuit path providing means comprises a triple-pole, double throw relay, a first pole of said relay having a first transfer contact comprising a first common terminal, a first normally open terminal and first normally closed terminal, said first common terminal being connected to said power cord receiving means at a terminal corresponding to the "hot" side of the AC power line, said first normally open terminal being electrically coupled to the "hot" side of the AC power line, said first normally closed terminal, being connected to said sensing current producing means, a second pole of said relay having a second transfer contact comprising a second common terminal, a second normally open terminal and a second normally closed terminal, said second common terminal being connected to said power cord receiving means at a terminal corresponding to the "neutral" side of the AC power line, said second normally open terminal being electrically connected to the "neutral" side of the AC power line, said second normally closed terminal being connected to said means for sensing a device 3. Safety start-up apparatus as defined in claim 2 wherein said triple-pole, double throw relay further comprises on AC operated coil and a third pole of said relay having a third transfer contact comprising a third common terminal, a third normally open terminal and a third normally closed terminal, said third common terminal being connected to one end of said coil, said third normally open terminal being connected to the "hot" side of the AC power line, the other end of said coil being connected to the "neutral" side of the AC power line, said third transfer contact comprising a "LATCHING" contact for said AC coil to keep said relay operating in its first operative state after said relay has been operated to said first operative state.

4. Safety start-up apparatus as defined in claim 1 wherein said means for verifying the presence of said sensing current comprises a first relay connected between a voltage potential and a ground reference potential, said voltage potential being present and derived from an AC power line when AC power is applied to said line, said relay being held operative when said AC power is present, said relay further having a normally open transfer contact.

5. Safety start-up apparatus as defined in claim 4 further comprising a second relay connected between a regulated DC voltage potential and a ground reference potential, said second relay being held operative when said regulated DC voltage potential is generated, said second relay having a normally open transfer contact.

6. Safety start-up apparatus as defined in claim 5 wherein said means responsive to said means for sensing a device comprises a semiconductor switching device and a third relay connected in series with said semiconductor switching device and a ground reference potential, said semiconductor switching device changing from a non-conductive to a conductive state to operate said third relay, said third relay having a normally closed transfer contact.

7. Safety start-up apparatus as defined in claim 6 further characterized by said third relay normally closed transfer contact being connected in series with said second relay normally open transfer contact and said first relay normally open transfer contact, said serially connected transfer contacts having one end connected to one end of an AC operated coil;

a momentarily operated switch connected between the "hot" side of the AC power line and said serially connected contacts, a triple-pole, double throw relay being operated to its first operative state when said momentarily operated switch is activated to restore AC power to the power device when the power device is in its "OFF" condition.

8. Safety start-up apparatus as defined in claim 1 wherein said means for verifying said sensing current comprises a light emitting diode (LED), said LED being illuminatd to provide a visual indication of the presence of said sensing current.

9. Safety start-up apparatus as defined in claim 1 further comprising means for generating a regulated DC voltage potential to supply power to said AC removal responsive means, said voltage generating means including means for producing a visual indication of the presence of said generated voltage potential.

* * * * *